United States Patent

Bodine et al.

[11] Patent Number: 5,987,471
[45] Date of Patent: Nov. 16, 1999

[54] SUB-FOLDERING SYSTEM IN A DIRECTORY-SERVICE-BASED LAUNCHER

[75] Inventors: Bill Guy Bodine, Orem; Nicholas Huston Franklin, Lehi; Randall R. Cook, Springville, all of Utah

[73] Assignee: Novell, Inc., Provo, Utah

[21] Appl. No.: 08/969,894

[22] Filed: Nov. 13, 1997

[51] Int. Cl.[6] ................................................ G06F 15/173
[52] U.S. Cl. .......................... 707/103; 707/10; 707/102; 345/350; 345/356; 395/200.31; 395/200.47; 395/200.56; 395/200.59
[58] Field of Search ................................. 707/10, 9, 102, 707/103; 395/200.31, 200.47, 200.56, 200.59, 200.52; 345/350, 356

[56] References Cited

U.S. PATENT DOCUMENTS

| | | | |
|---|---|---|---|
| 5,423,034 | 6/1995 | Cohen-Levy | 707/200 |
| 5,500,929 | 3/1996 | Dickinson | 395/160 |
| 5,697,129 | 12/1997 | Sonderegger et al. | 395/200.11 |
| 5,758,344 | 5/1998 | Prasad et al. | 707/10 |
| 5,761,499 | 6/1998 | Sonderegger | 707/10 |
| 5,771,379 | 6/1998 | Gore, Jr. | 707/101 |
| 5,778,222 | 7/1998 | Herrick et al. | 707/9 |
| 5,778,385 | 7/1998 | Pratt | 707/200 |
| 5,794,232 | 8/1998 | Mahlum et al. | 707/3 |
| 5,859,978 | 1/1999 | Sonderegger et al. | 395/200.56 |

*Primary Examiner*—Jean R. Homere
*Attorney, Agent, or Firm*—Madson & Metcalf

[57] ABSTRACT

A directory services system includes resource objects, such as an application object for accessing a resource associated with the resource object. Foldering attributes may be provided or added to an existing or new, specialized resource object. Foldering attributes reflect correspondence of the actual resources to an organizational scheme. The foldering attributes may include not only linking and backlink information, but management data for multiple levels of linking and organization, all stored in a Network Directory Services resource object. A resource, via its resource object in the directory services database, may be easily assigned to an organizational position for an individual user, a group, container, or the like. A snap-in module may be created, having executables as one or more Application Programming Interfaces (API's) in a Dynamic Link Library (DLL) for consuming (using) the foldering attributes. A utility may be provided in the Directory Services Systems' Administration module, or as on of such modules, to create and manage the foldering attributes. In certain embodiments attributes may be in objects requiring no methods embedded therein. In other embodiments methods in resource objects may contain additional executables or even obviate API's in the DLL.

10 Claims, 11 Drawing Sheets

SUB-FOLDERING SYSTEM IN A DIRECTORY-SERVICE-BASED LAUNCHER

BACKGROUND

1. The Field of the Invention

This invention relates to networked computer systems and, more particularly, to novel systems and methods for providing file management, using directory services systems, as well as true subfoldering with minimum effort.

2. The Background Art

The present invention relies on, and improves upon, the management of application programs in a computer network by an application launcher or network application launcher programmed for managing applications in a multi-server network through the use of application objects in a directory services database. This technology is described in U.S. patent application, Ser. No. 08/940,789, incorporated herein by reference.

Modern computer networks may contain several servers and numerous clients hosting software administered by a "network administrator". A wide variety of application programs such as word processors, spreadsheets, database managers, program development tools, and the like (collectively, "applications") are typically found on one or more servers in the network. Necessary file access rights and execution environments must be provided by the administrator, and users need notification. Sometimes executable codes and other resources are scattered, and may be replicated, making administration difficult.

A network application launcher (e.g. Novell's NAL) provides computer-implemented methods and apparatus for consistently determining the nature and location of application program executable codes in a network, using directory services objects.

When users work at a workstation, or need to access the same data, files, and environment with which they are familiar, users typically travel from one work site to another, they often prefer to maintain the performance and familiarity of the organization and file systems on a network they ordinarily use. Users who must work with the same information daily wish to see it the same way. Moreover, away from the normal place of business certain software applications and other resources need to be seen in the format on which a user depends. The organization of resources needs to be stable. An application is typically launched from a server where a user has established rights. Likewise, organization into folders, and subfolders linked as desired is needed.

Upon traveling to a remote location, a user may rely on directory services to provide links to resources. Distributed systems that rely on or provide directory services have not been What is needed is a convenience for users and administrators for providing quickly, simply, reliably, and easily the desired foldering and subfoldering organization and retrieval services and maintenance abilities on remote servers, and other nodes, that are enjoyed on local area networks and individual workstations.

BRIEF SUMMARY AND OBJECTS OF THE INVENTION

An apparatus and method in accordance with the invention provide true foldering and subfoldering of files and resources using directory services. The tasks and data structures required for creation and management of hierarchies of folders may be divided between the directory services system and a file system on a network.

In general, any resource may be located and used (consumed) over a network by the appropriate service corresponding to the resource. Thus, herein, applications are used by way of example of a resource and application objects are examples of any suitable resource object. Directory services objects are known and described in the art.

The present invention's methods and apparatus for centrally managing application programs in a computer network, improve a Network Application Launcher (NAL) by modifying a database schema and executables (utilities) for managing its information. The database schema defines resources that can be represented, so network administrators have an efficient and effective way to make resources available on the network. Controlling organization, linking, rights assignments, and licensing or other access to a resource may be done simply, and transparently to network users, or groups of users, needing particular network resources.

The resources may be represented in a modified directory services database that includes resource (e.g. application) objects representing resources (e.g. application programs), such as printers, peripherals, word processors and spreadsheets, that reside on the network. The modifications to the schema provided by the present invention support the creation, deletion, alteration, management, and consumption of attributes in application objects in the network directory services (DS or NDS) database. In one embodiment, administrative routines for managing application objects are provided through "snap-in" modules that extend familiar administration tools presently used, for example, in Novell NetWare networks' NW Admin.

Each application object may represent one instance of a resource (e.g. an application) and its execution environment, including, for example, the location of at least one executable code, a brief name that identifies the application, an icon, the location of the application's working directory, drive mappings and printer port captures needed, and the command line parameters (if any) that should be passed to the application to begin execution. Alternative embodiments of the invention may include utilities for managing attributes and executables for consuming them. Application objects may contain one or more of file rights attributes, licensing attributes, foldering links, a site list, fault-tolerance list, and load-balancing list for identifying a closest available, equivalent instance of a resource (e.g. application), and a disabling flag for easily removing such availability.

Other functions may also be added. The new, functional attributes may store key information in the central DS database, which is managed through specified administrator tools and user interfaces. Snap-ins are added to these tools to manage the new attributes. Database updates are thus readily performed with the administrator tools. The application launcher is provided with application programming interfaces (APIs) in dynamically linked libraries (DLLs) as executables for consuming the attributes in order to execute properly and transparently (to a user) an available, closest instance of a desired application.

To provide convenience for traveling users, a system administrator may edit certain attributes in an application object. These attributes may be created for distributing and specifying access and logical links between instances of application objects and corresponding applications. Thus, even though different instances or copies of an application may be hosted on different servers, they are logically the same, and may be so identified by proper values of attributes in an application object.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 11, is not intended to limit the scope of the invention, as claimed, but is merely representative of the presently preferred embodiments of the invention. The presently preferred embodiments of the invention will be best understood by reference to the drawings, wherein like parts are designated by like numerals throughout.

Figure 1:
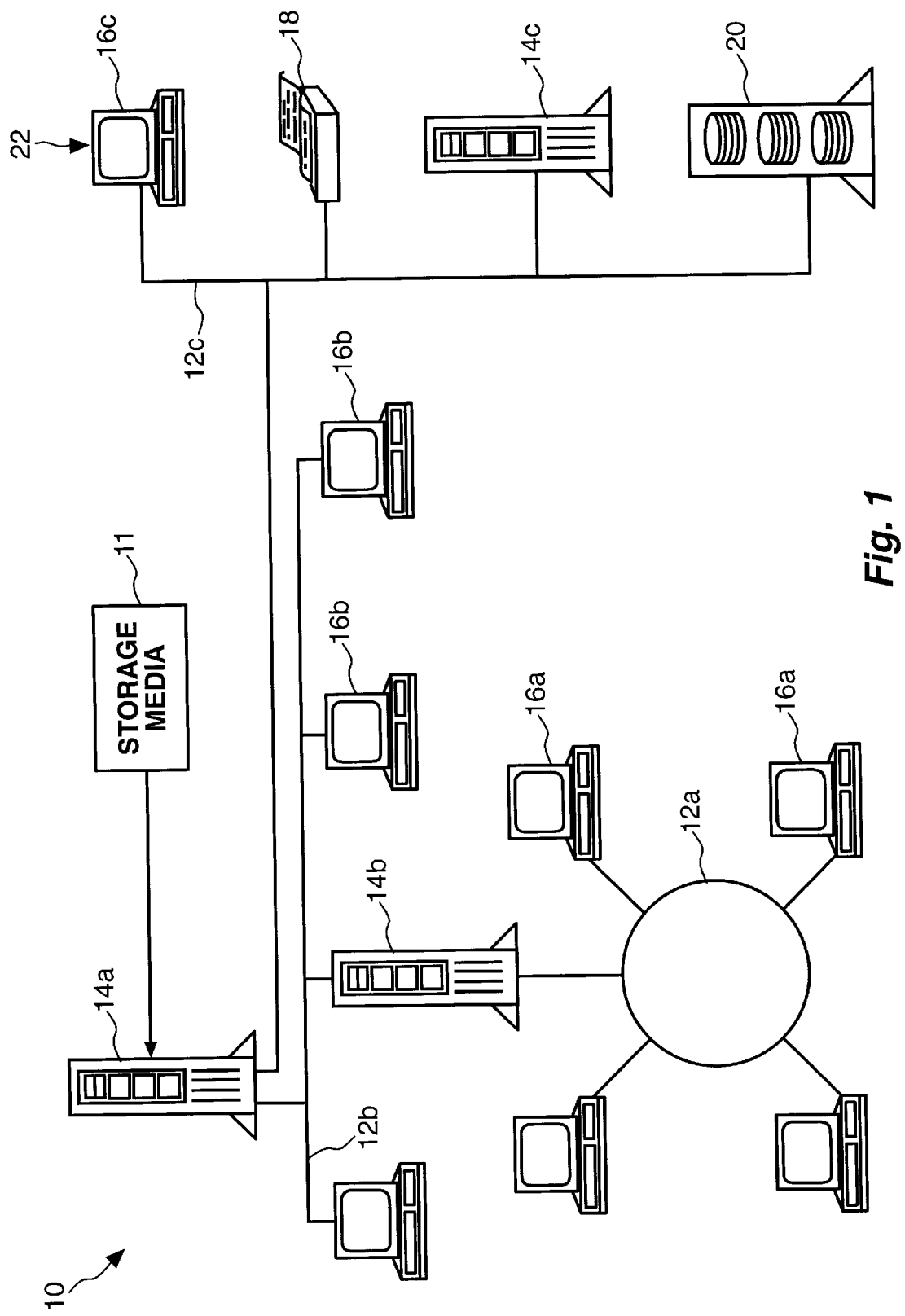
FIG. 1 is a schematic block diagram of a system of networked computers in accordance with the invention.

Referring to FIG. 1, a system 10 or network 10 of computers may include a storage medium accessible to one or more networks 12 (e.g. networks 12a, 12b, 12c). A network 12 may be provided service of files, applications, or other functions and data structures by a server 14 (e.g. servers 14a, 14b, 14c). Each network 12 may interconnect an appropriate number of nodes 16 or computers 16 of which a server 14 or router 14 may be warranted. In addition, various printers 18, storage devices 20, remote nodes 16 and the like may serve as resources 22 available to nodes 16 in the network 12.

Figure 2:
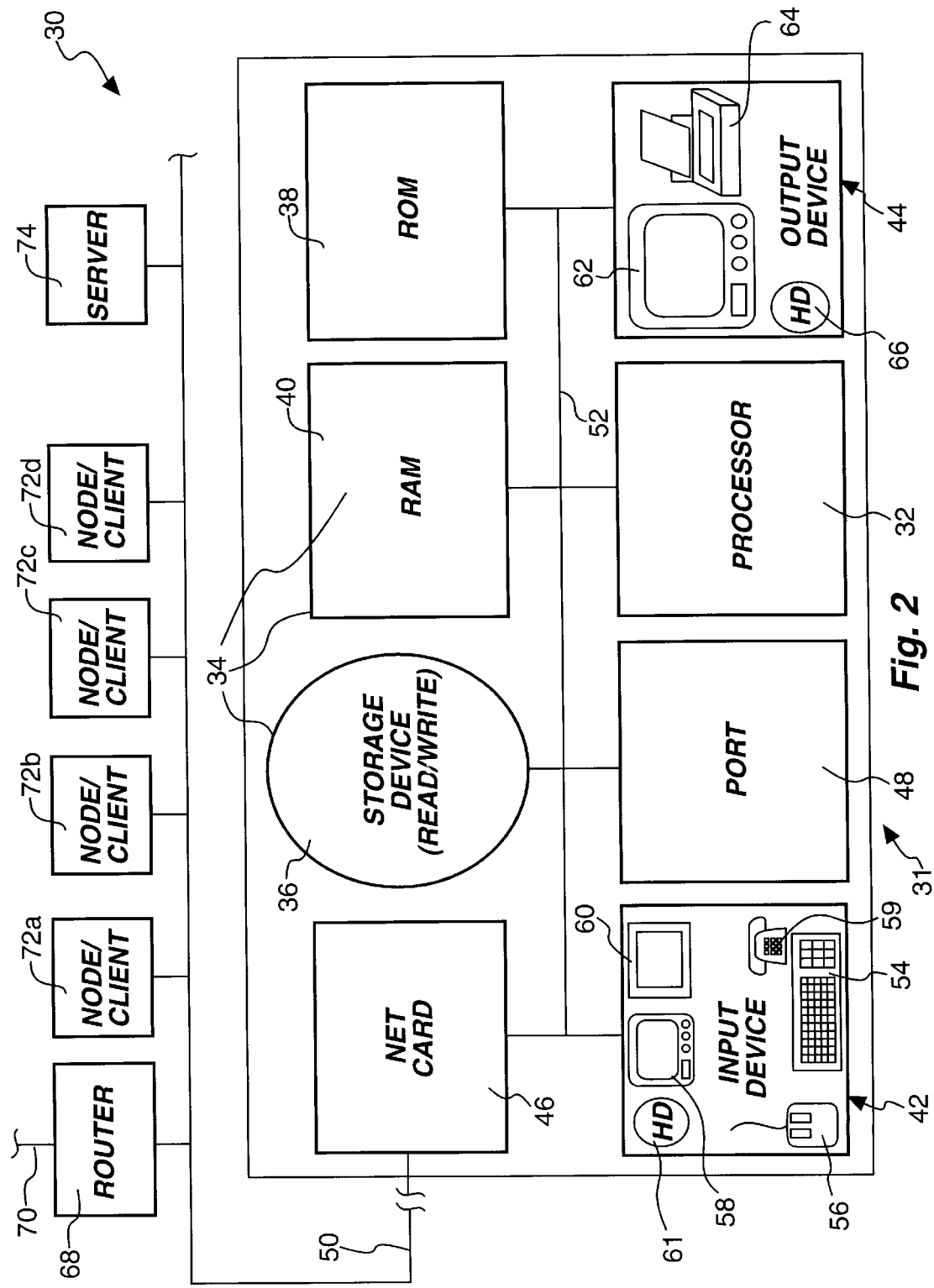
FIG. 2 is a schematic block diagram of an individual node in a network system such as that of FIG. 1.

Referring to FIG. 2, in general, any network 30 or apparatus 10, such as the network system 10 or apparatus 10 of FIG. 1, may include nodes 31 (e.g. nodes 14, 16, 70, 72, 74). Each node 31 may include a processor 32 and memory devices 34, such as storage devices 36, read only memory (ROM) 38, and random access memory (RAM) 40, sometimes referred to as operational memory. The node 31 may include a variety of input devices 42, and output devices 44 whether dedicated as illustrated in FIG. 2, or available over a network 12 of FIG. 1, as resources 22.

Typically, a node 31 may include a network card 46 for connecting to a network 50 (e.g. network 12) outwardly, and a bus 52 for interconnecting elements internally. Input devices 42 may include a keyboard 54, a mouse 56 or other pointing device such as a stylus or graphics tablet, a touch screen 58, a scanner 60, or even a storage device 61 for providing data to the node 31. Similarly, output devices 44 may include monitor 62, printer 64, storage devices 66, and the like for providing data from the node 31.

A router 68 may interconnect networks 50, 70 where each network 50, 70 may include some simple nodes 72, such as clients 72a–72d, and servers 74. Networks 12, 50, 70 are well understood in the art. Accordingly, the hardware illustrated in by way of an example, and not limitation as to the hardware suite on which the invention may be implemented. More or less equipment may be used in many particular embodiments.

Figure 3:
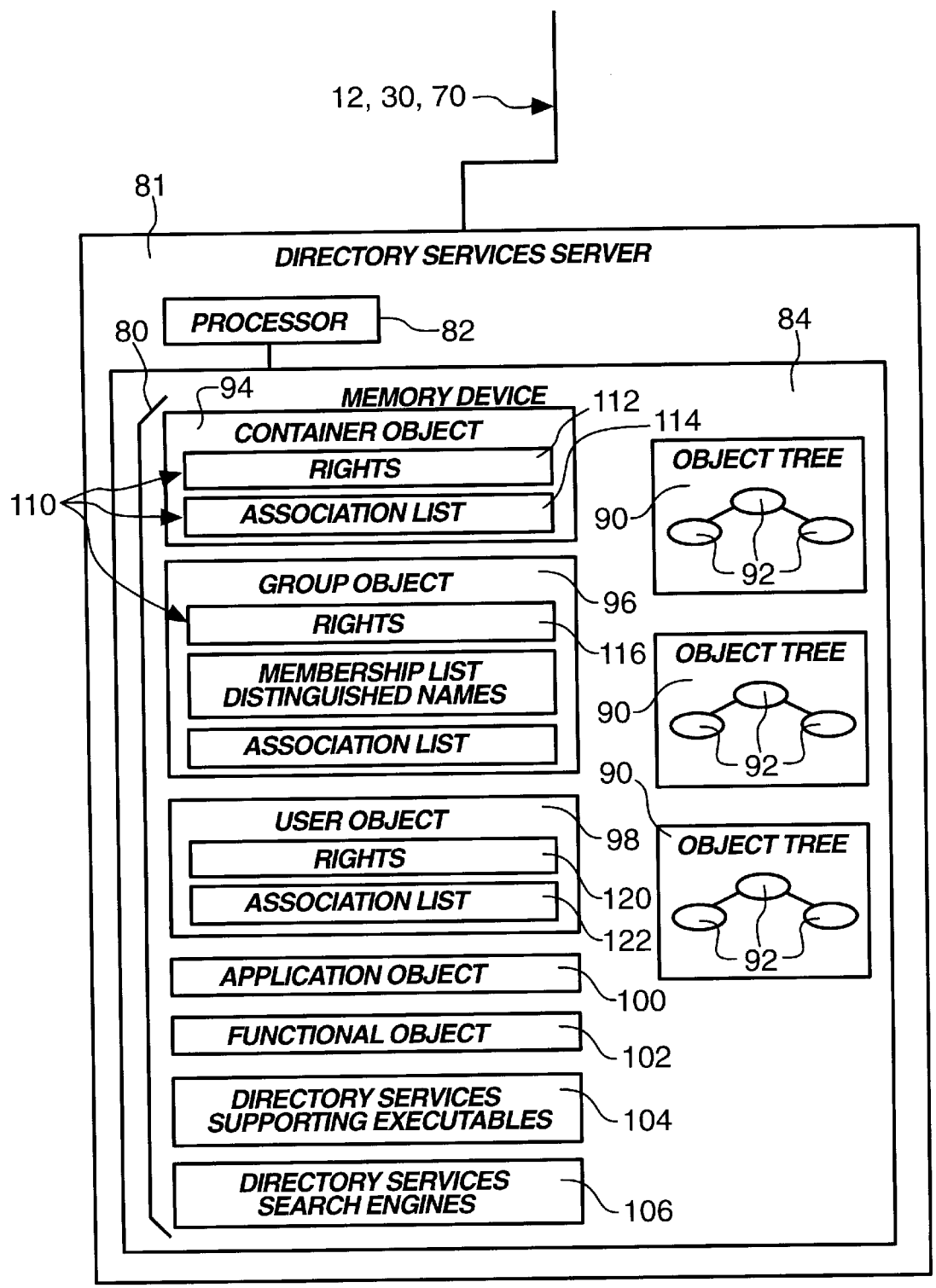
FIG. 3 is schematic block diagram of a directory services system on a server, such as a server of FIG. 1 and FIG. 2.

Referring to FIG. 3, directory services system 80 may be hosted on a directory services server 81. A directory services system 80 is typically highly distributed among nodes 31 over interconnected networks 12, 30, 50, 70, and thus may be referred to simply as directory services, regardless of which particular data structures and hardware may be implicated or required for a particular task.

Nevertheless, a directory services system 80, 81 may include a processor 82 for executing executables, where an executable may be any executable data structures from a single machine instruction to a sophisticated system of applications or the like. The processor 82 may rely on memory device 84 to create, manage, or store object trees 90 of individual objects 92 linked in a hierarchical relationship.

Entities corresponding to certain objects 92 use resources. Such objects may be thought of as consumer objects. For example, container objects 94 can contain other objects. A group object 96 merely contains information identifying relationships between objects 92, which relations need not be hierarchical. A user object 98 is one example of a consumer (of resources) object that may be identified by a group object 96, and contained in a container object 94 (a parent 94 to the leaf 98).

Resources such as printers, servers, and the like may be presented by directory services resource objects 92. One very useful object 92 is an application object 100, an example of a resource object. Certain important information associated with an actual executable file corresponding to an application is stored in the data structure of an application object 100. Various application objects 100, 102 may be stored and related in object trees 90 in a directory services system 80. A directory services system 80 includes numerous executables 104 known in the art and well described elsewhere. Likewise, directory services search engines 106, or simply search engines 106, may include sophisticated methodologies for creating and executing queries to locate specific objects 92 in an object tree 90 within a directory services system 80. One should keep in mind that, in general, a directory services system 80 may actually be distributed throughout the memory devices 11, 34, 84 of any appropriate number of networks 12, 30, 50, 70. Typically, an object 92 may be created to include methods 108, attributes, or both, as known in the art. For example, containers 94, groups 96, users 98, and applications 100 (abbreviating the names of these objects to a single word each) may each contain, respectively, certain rights 112, 116, 120 or rights attributes 112, 116, 120, and one or more association lists 114, 118, 122, for identifying other objects 90 to having some relationship thereto.

Figure 4:
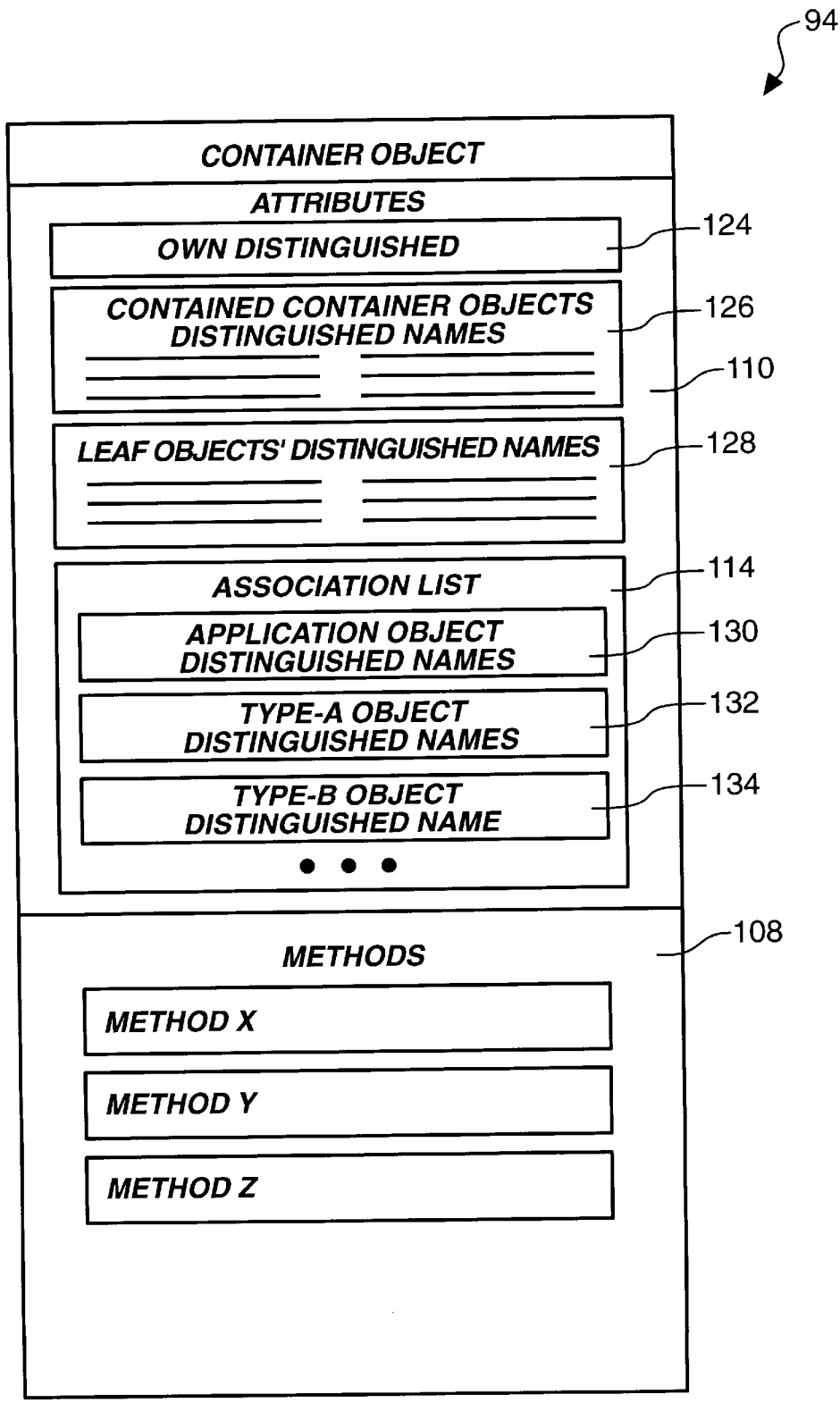
FIG. 4 is a schematic block diagram of a container object in a directory services system of FIG. 3.
Figure 5:
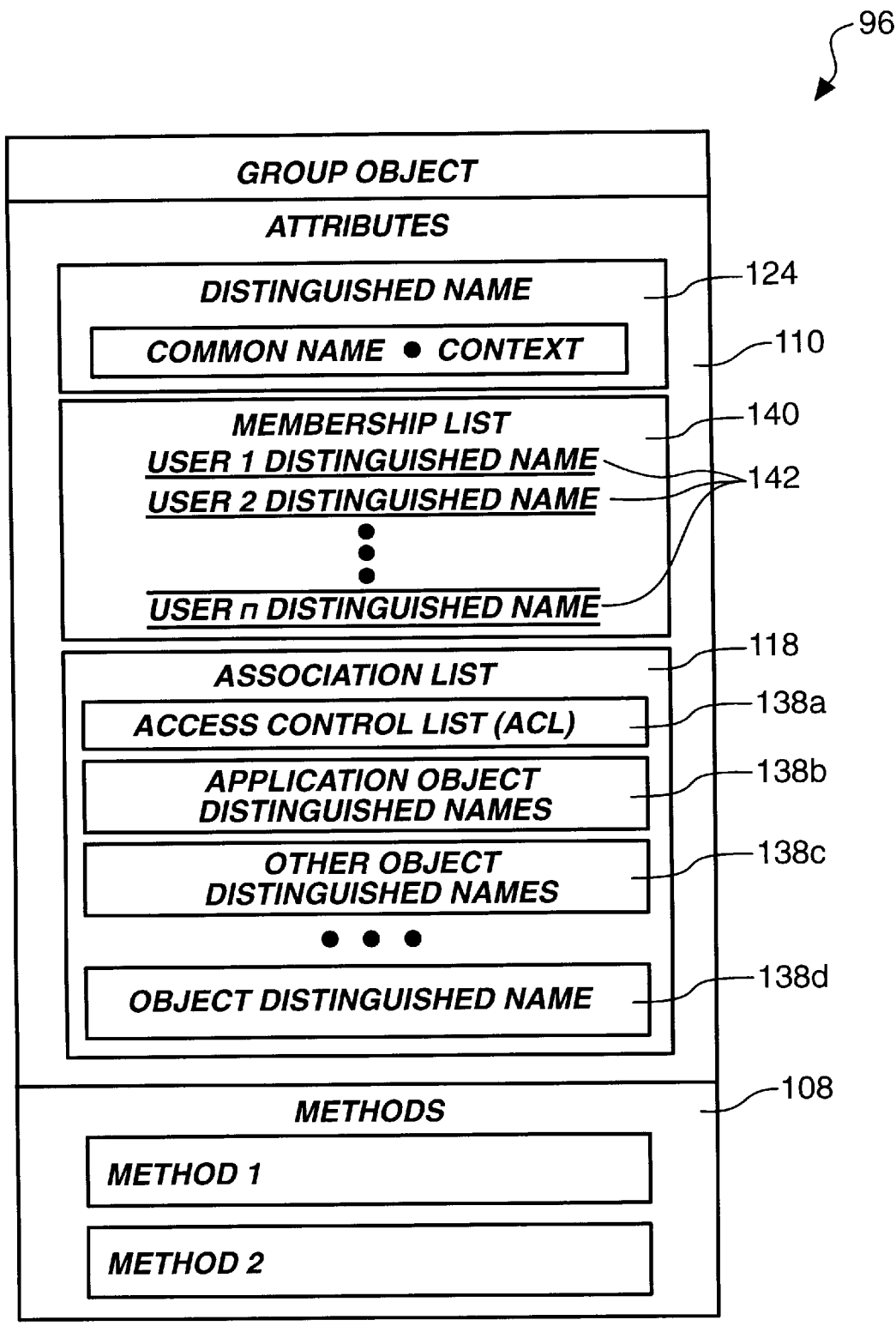
FIG. 5 is a schematic block diagram of a group object in a directory services system of FIG. 3.
Figure 6:
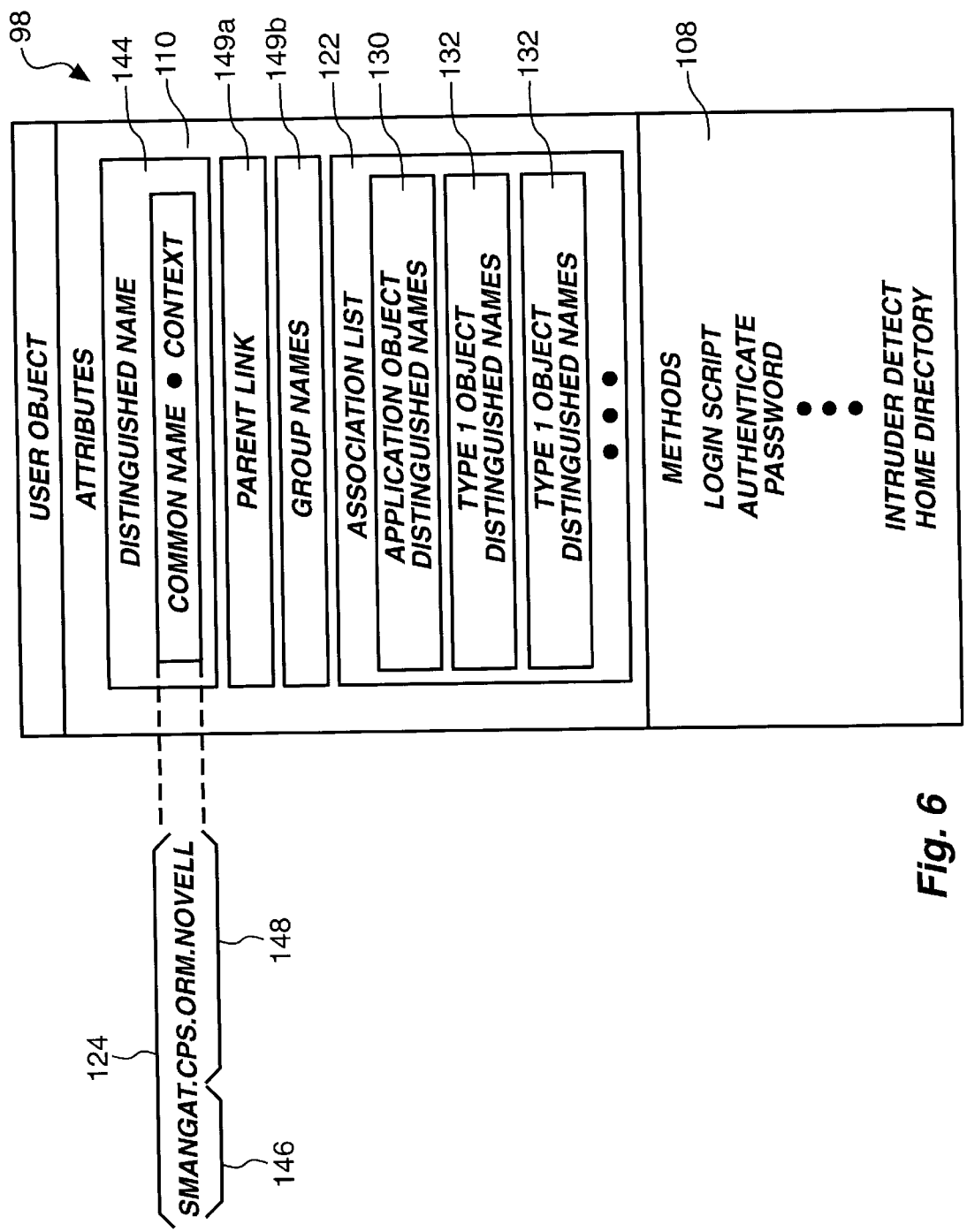
FIG. 6 is a schematic block diagram of a user object in the directory services system of FIG. 3.

Referring to FIGS. 4–6, in view of FIG. 3, an object 92, such as a container object 94, may include an attribute 110 of its own distinguished name 124. Likewise, for container objects 94, a list 156 of distinguished names contained therein or thereby is included, as well as a list 128 of leaf objects' distinguished names contained therein. The association list 114 may identify certain distinguished names 130, 132, 134 of application objects or other resource objects associated with the object 94, 96, 98 in question.

A group object 96 may include a binding data structure, typically an association list 118, identifying associations, such as, for example, access control lists 138a, application object distinguished names 138b, and distinguished names 138c, 138d of other associated resource and other objects. A group object 96 may also have certain unique attributes 110, such as a membership list 140 identifying the distinguished names 142 of all users or user objects 98 having membership in the group 96.

A user object 98 is associated with an individual user. The distinguished name 144 of FIG. 6 is exemplary of all distinguished names 124. Each distinguished name 124 typically includes a common name 146 in association with a context 148. Context 148 may include acronyms, abbreviations, or other identifications of organizations, geography, logical relationships, and enterprises, as illustrated. Context 148 is sometimes thought of as a logical path or may be so configured in a particular directory services system 80.

Figure 7:
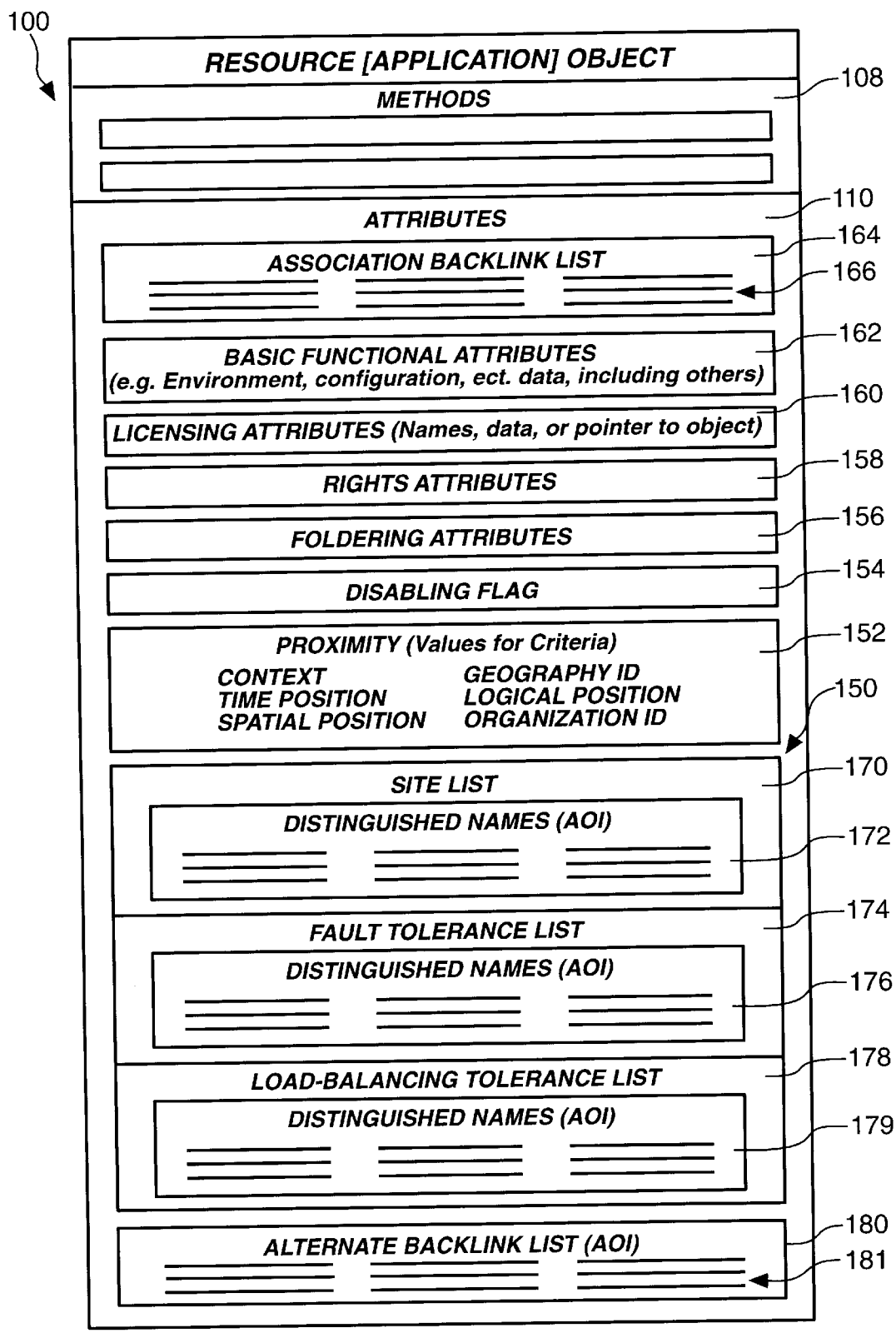
FIG. 7 is a schematic block diagram of an application object in accordance with the invention for inclusion in the directory services system of FIG. 3.

Referring to FIG. 7, an application object 100, in accordance with the invention, may include methods 108 and attributes 110. In one presently preferred embodiment, reliability attributes 150 (alternatively referred to as redundancy attributes, hierarchy of redundancy, or instance relation attributes) may be added to an application object 100.

A proximity attribute 152 may provide values associated with the application object 100 for determining the proximity of the application object 100 and its associated resources to a particular hardware location or physical user. The proximity attribute 152 may reflect a measurement, context, a time position or time for access, spatial position, organizational identification, logical position, or geographical identifier for identifying a proximity of an application object 100 with respect to a coordinate system locating another object, such as a user object 98, group object 96, or container object 94.

A proximity attribute 152 may reflect any measurement criterion effective for determining relative ease of access by one object 92 to a particular application object 100. A disabling flag 154 may provide an ability to determine whether or not an application object 100 has been removed from access. Configuration of environments, rights, masks, associations, and the like may be relatively time consuming and burdensome to the system.

To manage such allocation of configuration information when an application object 100 is to be removed from service for a short period of time, such as during maintenance, may be a colossal waste of time. Thus, a disabling flag 154 may be set as an attribute to be read by any executable attempting to access the application object 100. A disabling flag 154 allows the application object 100 to exist, fully configured, and yet be inaccessible. Thus, any executable seeking to access an application object 100 may be referred to the redundancy attributes 150 in order to find an equivalent instance to be used in place of the application object 100.

A foldering attribute 156 may be provided to store information indexing the associations corresponding to an application object 100 and other objects 92 in a directory services database 90. Rights attributes 158 may contain any information associated with authorizations appropriate to access of or by an application object 100.

Similarly, licensing attributes 160 may identify authorizations, charges, and other administrative information required for licensing an application associated with an application object 100. As understood in directory services systems, an object 92 (e.g. application object 100) represents logically certain files of data or executables (e.g. an application), and each is often spoken of as the other, though they are not actually the same thing. In general, the attributes 150–160 are new specialized attributes associated with certain features corresponding to the inventions disclosed herein, and may be incorporated into the basic functional attributes 162 associated with application objects 100 in general.

Thus, in certain embodiments, basic functional attributes 162 may include environment information, configuration information, and other data. In other embodiments, the attributes 150–160 may be included in the basic functional attributes 162. Meanwhile, other functional attributes may be added for special functionality.

A key attribute 110 of a resource object 100, such as an application object 100, may be an association back link list 164 containing distinguished names 166 of objects associated in some appropriate way with the resource object 100. The association backlink list 110 may be used for binding security, and management of access to the resource represented by the resource object 100.

The hierarchy 150 or redundancy attributes 150 may include a site list 170 of distinguished names 172, a fault-tolerance list 174 of distinguished names 176, a load-balancing list 178 of distinguished names 179, or all lists 170, 174, 178, where the distinguished names 172, 176, 179 represent alternative instances of application objects or application object instances (AOI). The distinguished names 172, 176, 179 may be relied upon when the application object 100 is unavailable for access.

All those certain preferred embodiments of an apparatus and method in accordance with the invention may use load-balancing, fault-tolerance, and remoteness of a user from a home network, to justify hierarchical reliance on the load-balancing list 178, fault-tolerance list 174, and site list 170, in that order, and the proximity value 152 may also be used for determining, in order and instance of an application object 100 to be accessed, based solely on the proximity attribute 152.

For example, if the disabling flag 154 is set to make the application object 100 inaccessible, for any reason, the hierarchy 150 may be relied upon in conjunction with the proximity attribute 152 in order to find the "closest" available instance of the application object 100 for access.

An alternate backlink list 180 may include distinguished names 181 of objects 92 (e.g. application object instances equivalent application object 100) in which the application object 100 is identified by a respective redundancy attribute 150. Thus, the alternative backlink list 180 provides administrative information for cleaning up associations throughout a directory services object tree 90.

Figure 8:
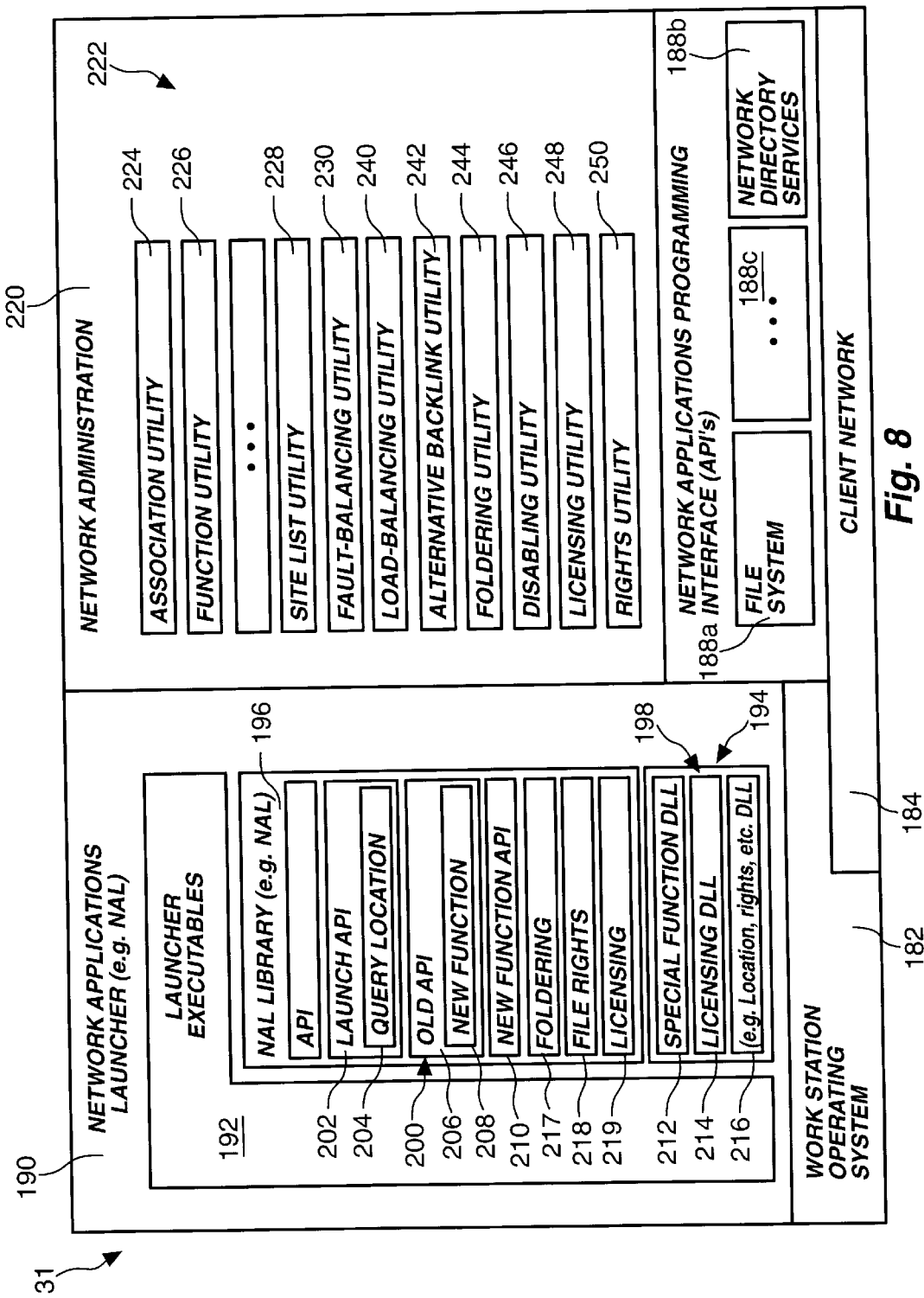
FIG. 8 is a schematic block diagram of a network application launcher system illustrating data structures for administrating and executing functions and data structures in accordance with the invention.

Referring to FIG. 8, a node 31 may contain executables in a storage device 34 for executing in a processor 32 (see FIG. 2) in accordance with the invention. An operating system 182 (workstation operating system 182) may interface with a client 184, alternatively called a client module or network client 184, connecting to a network 50. Network application programming interfaces (API's) 186 may include biosystem API's 188a, network directory services API's 188b, and other API's 188c interfacing directly with the client 184.

A network application launcher (NAL) 190, interfacing with the operating system 182 may include various launcher executables 192. Executables 192 may include single instructions, applications, libraries, functions, and the like, including specially programmed dynamically linked libraries (DLL) 194. For example, a NAL library 196 includes various API's 200 including a launch API 202, including a query 204 programmed to query an application object 100 for location data, such as proximity attributes 152. As a practical matter, the API's 200 may include adaptations of old, or less-conventional functions such as an old API 206, provided with a new function 208 for implementing the invention.

Alternatively, new functional API's 210 may be programmed for implementing certain embodiments of the invention. In yet another alternative, new DLL's 198 may be added, each DLL 198 being provided specifically for supporting a new special function in accordance with the invention. For example, a special function DLL 212 may be created for selecting a closest application object 100 to a user object 98 in a particular object tree 90.

Special function DLL's 212 may be created for providing fault-tolerance executables, load-balancing executables, and remote access executables for using (consuming) the attributes 150 of an application object 100. Thus, a special function DLL 212, or a new functional API 210, or simply a new function 208 in an old API 206 may contain the executables for consuming attributes 110 of an application object 100. In certain embodiments, a licensing DLL 214, a location DLL 216, for consuming the redundancy attributes 150, or a rights-management DLL for managing access rights, may all be included in a DLL 216 or individual DLL's 198.

Functions for licensing, dynamic assignment of file rights, foldering and subfoldering, and the like may be incorporated into one or more DLL's 196, 198, 212. In one embodiment, application programming interfaces (API's) 217, 218, 219 may be placed in a single DLL 196. The foldering API 217 may thus be the actual consumer (executable) to use foldering information (data). The file rights API 218 may be the consumer of file rights information. The licensing API 219 may consume licensing information. In certain embodiments, the API's 217, 218, 219 may do their entire special function with embedded data therein and the objects dealt with for foldering file rights assignment, and licensing, respectively.

The functionality of the DLL's 194 may be accomplished in several different ways. For example, in general, a network administration module 220 may contain utilities 222 for managing (creating, modifying, deleting, etc.) attributes 110 in an object 92, such as an application object 100. The DLL's 194 may be configured to consume (use, access, read, etc.) the attributes 110 managed by the utilities 222.

Figure 9:
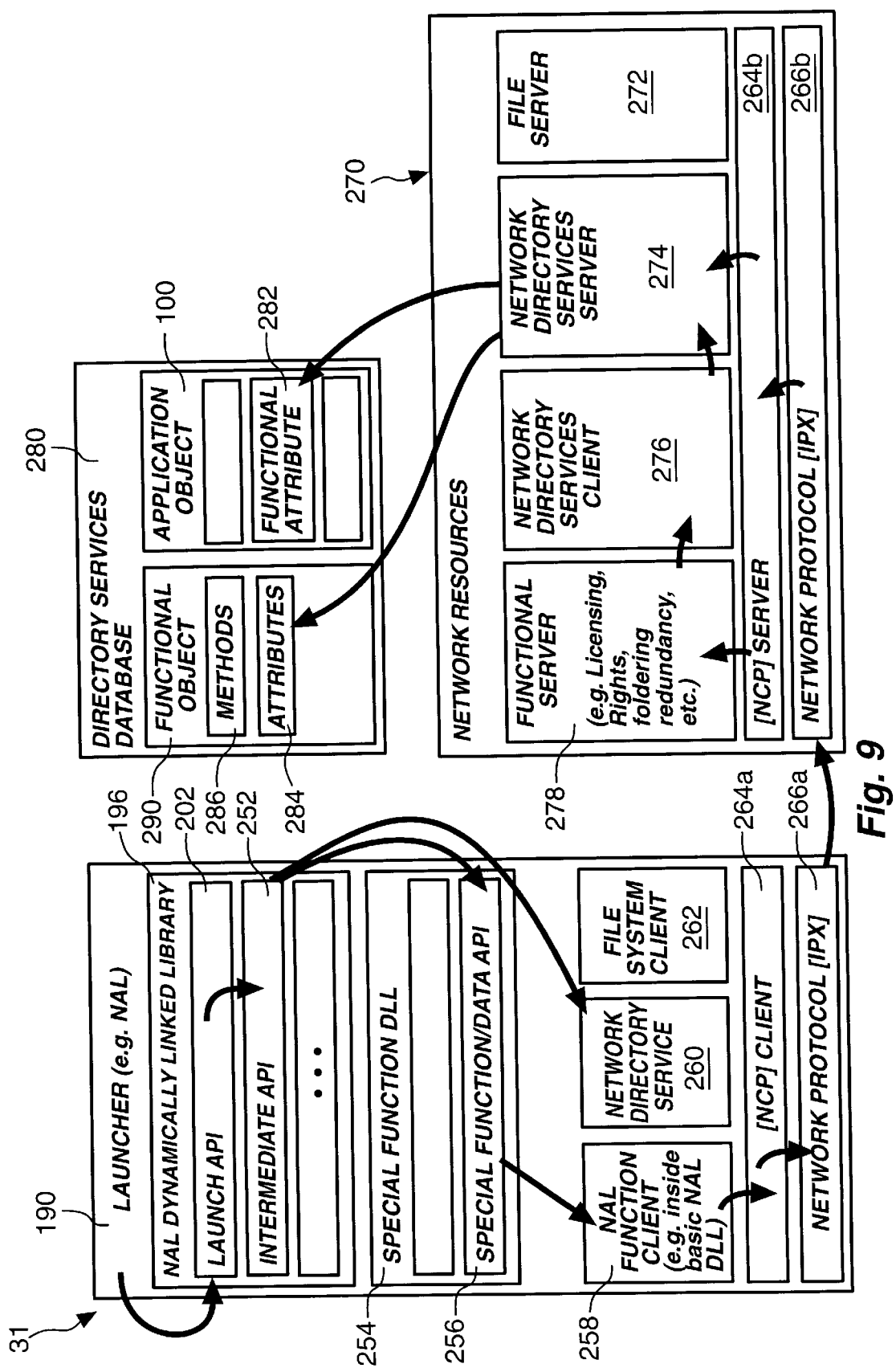
FIG. 9 is a schematic block diagram of data structures and operational access for one embodiment of an architecture for a network application launcher, such as that of FIG. 8.

However, a simple executable such as a new function 208 adapted to implement a feature of the instant invention may completely satisfy any functional need and use of an attribute 110. Alternatively, a new functional API 210 may be programmed to access or use an attribute 110. Alternatively, a new function 208, or new API 210, may provide indirection by calling another DLL 198 (e.g. 212, 214, 216) or APIs 200 to perform or supervise a desired function. FIG. 9 further elaborates on methods and data structures for these different approaches.

The utilities 222 are also referred to as snap-ins 222, and are each associated with some specialized functional ability. Thus, in general, an association utility may manage an association list 164 in application object 100. Other functional utilities 226 may be created for any particular need. Specific needs identified for embodiments for the instant invention may include a site list utility 228 for managing distinguished names 172 in the site list 170, a fault-tolerance utility 230 for managing the distinguished names 176 in the fault-tolerance list 174, a load-balancing utility 232 for managing the distinguished names 179 in the load-balancing list 178, an alternate backlink 234 for managing the contents of the alternate backlink list 180, a foldering utility 236 for managing the foldering attributes 156, a disabling flag utility 238 for managing the disabling flag 154, a licensing utility 240 for managing the licensing attributes 160, and a rights utility 242 for managing a rights attributes 158.

In general, an object 92 (e.g. application object 100) has attributes 110 and may have methods 108 for using certain of the attributes 110. A network administration module 220 manages the attributes 110 through the snap-ins 222 (utilities) in order that those attributes 110 will be available for use by API's 200 in the network application launcher 190.

Utilities 222 may be highly distinctive, or integrate many functionalities into a single utility. The architecture choice is largely available to a developer in order to provide the most robust and adaptable system. For example, in one presently preferred embodiment, the network application launcher 190 includes a query location executable 204 in the launch API 202 of the NAL library 196. The location of an application object 100 is identified thereby. Location may actually be defined and queried by any suitable rule.

In certain embodiments, location may be an identification by server, by actual spatial global positioning systems, by network directory services hierarchical position within a tree 90, by geographical location name, by context, by path, by any of the values of the proximity attribute 152, by routing speed between locations, by global addressing scheme, DHCP protocol, or the like. The query 204 may eventually access the redundancy attributes 150 and the proximity attributes 152 to resolve the query 204, select an application object instance, and complete the launch thereof.

Referring to FIG. 9, and certain features of FIGS. 2–8, a node 31 may host a launcher 190 relying on a dynamically linked library 196 of API's 200, such as a launch API 202 and intermediate API's 252 access thereby. In addition, special function DLL 254 including special function 256 operating as NAL function clients 258 with the network operating system clients 264 and network protocol 266 may access network resources 270. A file server 272, network directory services server 274, and specialized, functional servers 278 may operate as resources 270. The network resources 270, may access a directory services database 280 (via clients 276 to server 274), such as the object trees 90 (see FIG. 3) to access application objects 100, in order to provide the functional attributes 282 needed by the API's 256, 252, 202 to operate. In certain embodiments necessary attributes 284 may be provided along with methods 286, or alone, in specialized, functional objects 290 adapted to specific functions or purposes.

Referring to FIG. 9, a node 31 hosting a launcher 190 (NAL 190) relying on a NAL library 196 including a launch API 202 may call, or include, or otherwise engage, an intermediate API 252. In one embodiment, the calling API 252 may call, relying on indirection, a special function dynamically linked library 254 to access a special function API 256 adapted to the requested function, such as one of those associated with the attributes 110 of FIG. 7, DLL 194 of FIG. 8, and snap-ins 222 of FIG. 8.

The special function API 256 may also be thought of as a NAL client 258 or a NAL function client 258 for accomplishing a desired function. The client 258 may then access through the network client 264 a (e.g. for example, a netware core protocol) through a network protocol 266a client module (e.g. IP, IPX, etc.) to the server portion of the network protocol 266b and network server module 264b to access a functional server 278.

A functional server 278 may be dedicated to a particular function, such as the licensing, rights management, redundancy provision, or the like, in accordance with the attributes 110 and API's 200 of FIGS. 7–8. Thus, the server 278 may access a network directory services client module 276 contacting the directory services server 274 to provide access to a functional object 290 adapted to the desired function, and containing the attributes 84, methods 286, or both for accomplishing the function.

Alternatively, the launcher 190 may call the launch API 202 which, after engaging the intermediate API 252, may engage a network directory services client module 260. The client 260 may then access through the client 264a, protocol 266a, protocol 266b, and server module (interface 264b), the network directory services server 274. In this embodiment, the network directory services server 274, (server 274) may then access directly a functional attribute 282, such as any of the attributes 110 of the application object 100. Thus, in this embodiment, a calling API 252 may actually consume the attribute 110 provided in accordance with the invention implementing benefits of any particular function of the invention.

In one embodiment, a single attribute 110 may be used, in alternative embodiments, any number of the attributes 110 may be used in an application object 100, or a specialized functional object 290 program for a specific purpose. For example, a licensing object 290 may be provided, or a rights management object 290, or the like.

Thus, when a launcher 190 accesses a launch API 202, the launch API 202 may perform alone or may rely on an intermediate API 252 directly or using further in direction. The intermediate API 252 may be configured for to executing specialized function directly. Alternatively, the intermediate API 252 may engage the client 258 to obtain access to a specialized, functional object 290 for executing the desired functional features.

In yet another, third, embodiment, the intermediate API may access a network directory services client 260 in order to obtain functional attributes 282 directly from a directory services database 280 in an application object 100. Thus, high levels of sophistication may be provided in the methods 286 and attributes 284, or function attributes 282 may be accessed directly for use in API's 200, such as the API's 252, 256 programmed to provide any required skills.

In a simple, but less flexible, approach, an intermediate API 252 may have a desired executable embedded therein, or in the launch API 202 itself may have any functional executables embedded therein. Thus, programming may be simplified but rigid, or flexible, but more complex, by any of the above mechanisms. The functional features of providing associations, the remote accessed at distance sites from a home network, providing fault-tolerance access to alternative objects 92, 100, load-balancing by accessing alternative servers 14, backlinking, foldering of application objects 100 or other objects 92 to be displayed, viewed, and managed in some logical hierarchy, disabling an object 92, particularly an application object 100, without having to remove and restore configuration, licensing, and rights management, may all be provided by individual combinations of attributes 110 managed by snap-ins 222 and consumed by API's 200 in the network application launcher 190.

Figure 10:
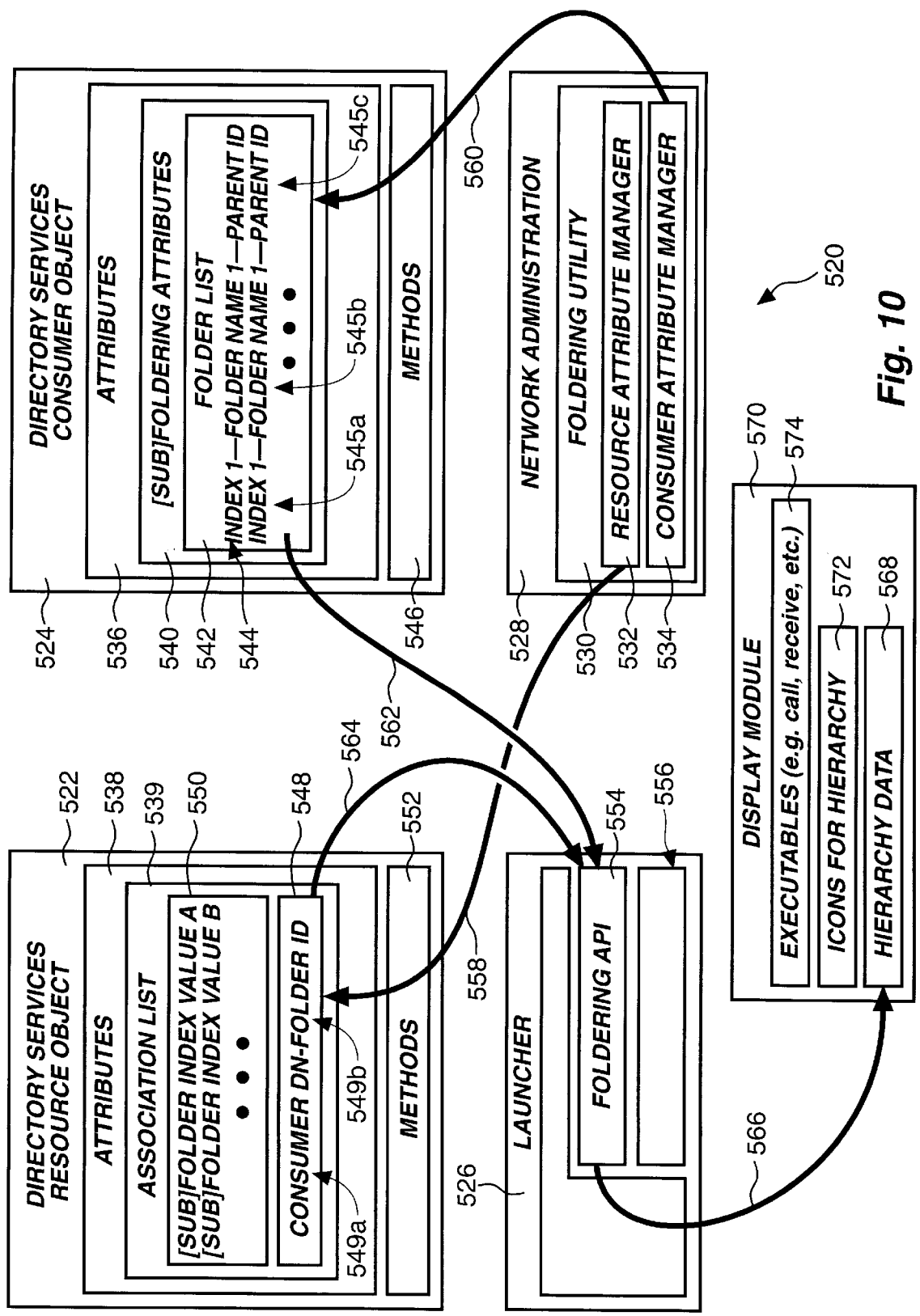
FIG. 10 is a schematic block diagram of data structures suitable for implementing a foldering system in accordance with the invention, which may use the directory services system of FIG. 3, in conjunction with the data structures and architecture of FIGS. 2–9.

Referring to FIG. 10, a foldering system 520 may be implemented in a network 10, 30 on one or more nodes 31, 72. A foldering system 520 may include one or more directory services resource objects 522, also referred to simply as resource objects 522. A directory services consumer object 524 may be any of the container objects 94, group objects 96, user objects 98, and the like as described with respect to FIGS. 3–6. Siarly, the resource object 522 may be of any type described with respect to resource object 100 of FIG. 7, or the like.

In one current and preferred embodiment, a launcher 526 may be provided. The launcher 526 contains executables as described with respect to FIGS. 8 and 9. The launcher 526 may include one or more of the functional features described with respect to the API's 200. The functionality of the API's 200 is typically programmed to be that of being a consuming executable for using attributes 110 in resource objects 100, such as the directory services resource object 522.

In one embodiment, a network administration module 528 may serve a function similar or identical to that of the module 220 in FIG. 8. Accordingly, the network administration module 528 may receive one or more of the snapins 222. The network administration module 528 may include a foldering utility 530. The foldering utility is functionally responsible for maintaining attributes 110 in resource objects 100, 522. In one embodiment, the network administration module 528, and more particularly the foldering utility 530, may also be responsible for managing certain attributes 110 in consumer objects 94, 96, 98, 524.

In one presently preferred embodiment, a resource attribute manager 532 maintains data in the resource object 522, while a consumer attribute manager 534 contains executables for maintaining data values in the consumer object 524. Note that the consumer object 524 may be of any of the types permitted in a directory services system, such as the container 94, group 96, or user 98 types of objects. Thus, for example, attributes 536 associated with a consumer object 524 may be multi-valued, and the values thereof may be maintained by the consumer attribute manager 534 of the network administration module 528. Similarly, the resource attribute manager 532 may be dedicated to maintaining the attributes 538 in the resource object 522.

Among the attributes 538, may be an association list 539 identifying directory service objects 92 having some relationship or association with a designated resource object 522. In one embodiment, the consumer object attributes 536 may be embodied in an association list. Nevertheless, certain foldering attributes 540, alternatively referred to as subfoldering attributes 540, may simply be contained within a consumer object 524 as unique attributes 536 distinct from any type of association list. Nevertheless, the foldering attributes 540 may typically be structured to contain a folder list 542.

A folder list 542, in one embodiment, contains data structures designed to identify a unique organizational structure or a hierarchy corresponding to a specific consumer object 524. For example, a folder list 542 may effectively comprise a binding table 542 containing entries 544. The entries 544 may associate some type of an index number 545a with a folder name 545b associated with an organizational folder 545b for containing or associating resource objects 522. Meanwhile, an identification 545c or parent identification may be provided for linking a folder name 545b in an entry 544 with a parent object 92 (e.g. container 94) related thereto.

The attributes 536 of consumer objects 524 may include foldering attributes 540. The foldering attributes 540 may typically include a folder list 542 providing binding between names 545b of folders, the identification 545c of parent objects or parent folder objects associated with the named folder or folder object in an entry 542, and some index number 545a. For example, the index number 545a may be simply a short-hand numerical reference by which a particular folder object may be quickly identified by the processor 32.

In certain embodiments, no methods 546 are included in consumer objects 524. Nevertheless, in keeping with object-oriented programming, attributes 536 and methods 546 may be included in a consumer object 524. For example, many of the functions currently provided by the administration module 528, or various dynamic link libraries 194, or application programming interfaces 200 may actually be provided by methods 546. Nevertheless, in one presently preferred embodiment, the foldering attributes 540 may stand alone as attributes 536 of the consumer object 524, and methods 526 may be dispensed with by providing executables elsewhere in the launcher 526, network administration module 528, and the like, for consuming or using the attitributes 536, such as the foldering attritbutes 540.

The folder list 542 may be constructed in any manner that will provide a hierarchy, organization, relationship, or the like associating folders with one another. Typically, folders may be represented by container objects 94. Thus, each folder container 94 may be associated with another container 94 as a parent. Inside any container object 94 representing a folder, may be placed a resource object 522 corresponding to a resource that is organized within the folder represented by the designated container object 94.

Since containers object 94, group objects 96 and user objects 98 may all be used with a directory services system 80, each may be used or linked in a suitable fashion by association lists 539, attributes 536, 538 and the like. In one embodiment, the folder list 542 may include forward links and back links to parents and children of a specific folder identified with or by a container object 94. Nevertheless, less data is required if the link is unidirectional, only to the identification of a parent (other parent container 94).

In one presently preferred embodiment, link data 548 is provided as one of the attributes 538 of a resource object 522. Thus, a resource object 522 may contain, for example, link data 548 identifying the distinguished name of a consumer object 524 linked to a folder identification, such as an index number 545a of the folder list 544 into which a resource object 522 will be placed, stored, linked, associated or the like.

As alluded to above, forward links, such as the folder list 542, and back links, such as the link data 548, may be contained in either the resource object 522, the consumer object 524, or both. In one presently preferred embodiment, having forward link 542 (folder list 542) as an attribute 536 of the consumer object with a back link 548 as an attribute 538 of the resource object 522 provides a compact, efficient assignment of data for storage between the objects 92 in a directory services system. Thus, each object 522, 524 has available the data corresponding links to itself.

As with a consumer object 524, a directory services resource object 522 may include methods 552. Nevertheless, a launcher 526 may be made very effective and general. For example, a foldering API 554 may be included in a dynamic link library 556 in a launcher 526. Accordingly, whenever a resource object 522 is to be requested (launched, engaged, used, etc.), a generalized foldering API may have been already used to link the resource object 522 with a hierarchy defined by a folder list 542.

As illustrated in FIG. 10, a very efficient distribution of data structures is provided. This does not require the specific assignment, distribution, or association of each data structure with the particular object 522, 524 or module 526, 528, illustrated. Nevertheless, in one presently preferred embodiment, operational efficiency and efficiency of data storage may be accomplished by the architecture illustrated. Thus, a folder list 542 may define a hierarchy of folder objects constituted by container objects 94 having distinguished names 124 that may be illustrated, displayed, or thought of as folder names 545b in the entries 544 of a folder list 542.

A link to a parent identification 545c permits all folder names 545b to be linked together in any organizational structure. Meanwhile, the presence of a numerical index value 545a in each entry 544 permits rapid pointing and processing when any entry 544 is required to be used.

The back link 548 effectively identifies to an executable relying on the attributes 538 of a resource object 522 the specific folder index number 545a and the specific consumer object 524 to which the resource object 522 is intended to pertain. Thus, a consumer distinguished name 549a corresponds to the distinguished name of the consumer object 524. Linked thereto and stored in the attribute 538 as the back link 548, is the folder identification 549b. The folder identification 549b may be identical to the specific index number 549a whose folder 545b will contain the resource object 522.

In one embodiment, a resource attribute manager 532 creates, manages, or otherwise provides 558 the values of the attributes 538 needed for supporting a foldering system 520. For example, the resource attribute manager 532 may create, manage, modify, and the like, the list 550 of folder index values or subfolder index values in an association list 539. Of course, the index values 550 may be independent attributes 538, rather than being within an association list 539. Nevertheless, an association list 539 is a convenient and appropriate place for storing the subfolder index values 550. Likewise, the resource attribute manager 532 may provide 558 by creation, deletion, modification, and other management the values of consumer distinguished names 549a and folder identification numbers 549b in the back link 548.

Similarly, the consumer attribute manager 534 in the foldering utility may provide the values for index numbers 545a, folder list names 545b and parent identification 545c in the folder list 542. Thus, a foldering utility 530, in general, associated with or nested within a network administration module 528, such as the administration module 220 in FIG. 8, is responsible for maintaining the attributes 538 required for foldering, and the attributes 536 of the consumer objects 524 required for foldering.

The consuming executable 554, typically a foldering API 554, may thereby use 562 the folder list 542 or other foldering attributed 540 provided by the consumer attribute manager to the consumer object 524. The foldering attributes 540 may also be referred to as subfoldering attributes 540 or consumer foldering attributes 540. The consumer foldering attributes 540 are consumed by the consumer executable 554, a foldering API 554 in the example of FIG. 10. The foldering attribute 540 may be thought of as containing a definition of a foldering hierarchy, and may be defined in terms of directory services objects 92.

The consuming executable 554, or foldering API 554 in the instant example, likewise uses 564 or consumes 564 certain attribute 538 from the resource object. The folder index values 550 or subfoldering index values 550 and the back link 548 may be consumed 564 by the foldering API 554 as resource foldering attributes 538. Thus, more generally speaking, consumer foldering attributes 540 may define a hierarchy of folder objects associated with a consumer object 524. Resource foldering attributes 538 may contain index values 550 and back links 548 to link to such a hierarchy 542 or folder list 542.

Nevertheless, the consuming executable 554 actually provides the linking information between the attributes 538 and attributes 536 to be provided 566 to the display module 570 as hierarchy data 568. The foldering API 554 may combine 566, process 566 or otherwise operate 566 to link 566 the attributes 536, 538. In one embodiment, the foldering API 554 may simply write data from the consumer foldering attributes 540 and resource foldering objects 438 into selected locations implying binding in the hierarchy data 568.

The folder list 542 and the hierarchy 542 embodied therein, may stand independent from details of a resource object 522 linked thereto. In practice, one presently preferred embodiment of an apparatus and method in accordance with the invention relies on a foldering API 554, or an alternative executable data structure 554, 552, 546 to consume or use the back link 548 and the folder list 542. Preferably, the foldering API 554 may simply be another API 200 in the dynamic link library 556.

By whatever method, the foldering API 554 (or other equivalent consuming executable 554) may provide hierarchy data 568 linking all the folder names 545b to the corresponding resource objects 522. The foldering API 554 may thus provide to a display module 570 the information needed to present to a user or other entity associated with a consumer object 524. In general, the display module may include any or all of the executables, data, drivers and the like normally associated with providing to an output device 44, such as a monitor 62, data required to produce a display.

In general, icons may be associated with a display module 570 and may be effective in a minimum space by being standardized, and stored in a single location. Thus, a display module 570 may contain data structures 572 for defining, displaying or otherwise operating to providing display icons. The executables 574 may include executables for operating on icon data 572 or the executables for operating on icons may be combined with the data as the icons 572 for hierarchies.

Certain executables 574 may exist in the display module 570 for calling or otherwise engaging the launcher 526. Thus, the display module 570 may engage the launcher 526 for identifying resource objects 522 in relation to consumer objects 524. Thus, the executables 574 may engage the services of the launcher 526 and foldering API 554 to provide the hierarchy data 568 from resource foldering attributes 538 and consumer foldering attributes 540.

The display module 570 may then combine the hierarchy data 568 with icons 572 for presenting a display on an output device 44 such as a monitor 66. An individual user, or users within a group or other organization, may thus receive a useful display organizing all resource objects 522 uniquely in accordance with a set of foldering attributes 540 corresponding to the consumer object 524 in question. That is, a user may have a user object 524 having a unique set of foldering attributes 540 while participating in a group corresponding to a group object 96 as a consumer object 524 having a different group-wide subfolding system 540.

In one presently preferred embodiment, foldering between consumer objects 524 at different levels such as user objects 98, group objects 98 and container objects 94 may all be organized with either consistent, identical, or unique foldering attributes 540. The data structures 538, 540 554 may be programmed to provide virtually any concept for hierarchy data 568 permitted by a directory services system 80.

Figure 11:
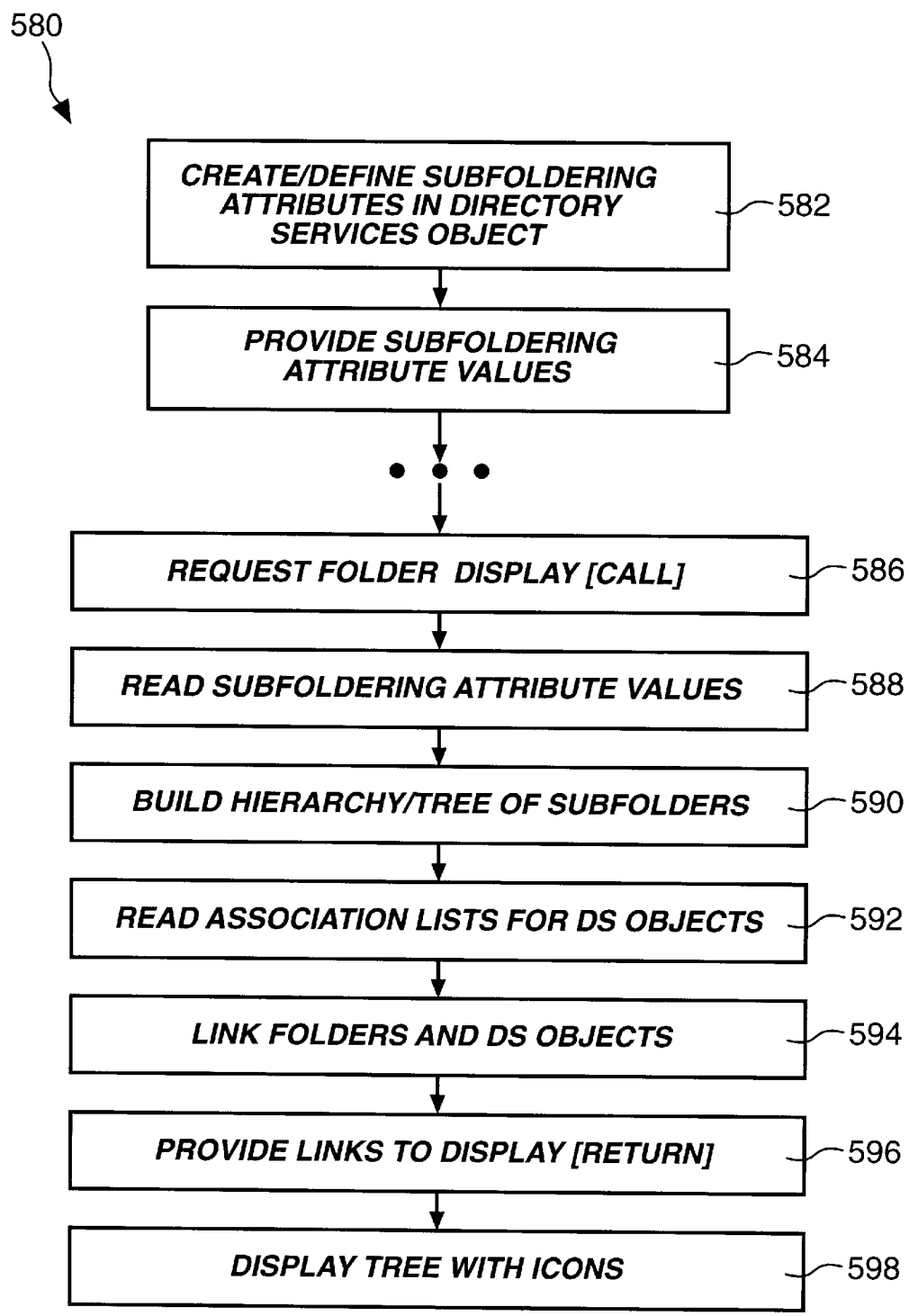
FIG. 11 is a schematic block diagram of methods for implementing one embodiment of the functions and data structures of FIG. 11 in accordance with the invention.

Referring to FIG. 11, a method 580 for implementing a foldering system 520 is illustrated. In one presently preferred embodiment, a create step 582 may define foldering or subfoldering attributes 540 in a directory services object 92. For example, foldering attributes 540 in a consumer object 949b, 98, 524, and foldering attributes 538 in a directory services object 522 may be created 582 in the schema of a directory services system 80. Instances of such objects 522, 524 may then be created in the directory services system 80. In one embodiment, the directory services system 80, and specifically the supporting executables 104 (see FIG. 3), normally associated with creating objects 92 and organizing them into object trees 90, may perform the create step 582. A network directory services system such as the Novell NDS may provide the create step 582.

A provide values step 584 may provide foldering attribute values or subfoldering attribute values in the consumer foldering attributes 536 and resource foldering attributes 538. Thus, for example, the foldering utility 530 may provide the index values 550 in the association list 539 of the resource object 522 along with the link data 548 or back link 548. Similarly, the foldering utility 530 may provide the folder list 542 and the entries 544 associating index numbers 545a with folder names 545b and parent object identifiers 545c. In one embodiment, the provide values step 584 may be performed by separate executables 532, 534. For example, the resource attribute manager 532 may provide 584 the values in the resource foldering attributes 538, while the consumer attribute manager 534 may provide 584 the consumer foldering attributes 540.

A request step 586 may reflect a call or other engagement of the foldering system 520. In one embodiment, a request 586 effectively calls the launcher 526. The launcher 526, then engages the foldering API 554 to operate on the attributes 536, 538 in providing a system of folder hierarchy data 568.

The read step 588 may embody one or more steps in obtaining the resource foldering attributes 538 from the resource object 522 and the folder list 542 of the consumer foldering attributes 540. The foldering API 554, or an equivalent consuming executable 554, may perform the read step 588. The read step 588 may also include certain processing to otherwise provide the values of the foldering attributes 536, 538 of the consumer object 524, and resource object 522, respectively.

The build step 590 is performed by the consuming executable 554, preferably a foldering API 554 in the launcher 556. The build step 590 may process entries 544 from the folder list 542 in combination with the link data 548 to provide a portion of the hierarchy data 568. In general, however, the build step 590 may merely include the building of a limited amount of hierarchy data 568 based strictly on the folder list 542.

In one currently preferred embodiment, the read step 592 is executed by the foldering API 554. The read step 592 may include reading the subfolder index values from the association list 539 of the resource object 522. In general, subfoldering index values 550 point to index values 545a in various folder lists 542 associated with consumer objects 524 in a director services system 80. Thus, a resource object 522 may be associated by a subfolder index value 550 (also referred to simply as a folder index value 550) with a consumer object 524. Thus, each of the folder index values 550 may point to a specific index number 545a in a folder list 542. The resource object 522 may thus be associated with numerous folder names 545b, in one or more consumer objects 524. Alternatively, a consumer object 524 may place a single instance of a resource object 522 in a single folder 545b. In general, although it may be more wasteful of storage space, as well as burdensome on a directory services system 80 for maintenance, index values 545a may be global rather than local to a consumer object 524. In another currently preferred embodiment, the index values 545a are unique within the foldering attributes 540 of a single consumer object 524.

Thus, a resource object 522 may be represented in a single folder name 545b identified by an index value 545a corresponding to a folder identifier 549b in the link data 548. For example, a resource object 522 may "know" the consumer distinguished name 545a corresponding to a consumer object 524. Thus, the folder identifier 549b may point to an index value 545a or folder name 545b in a folder list 542 of the consumer object 524.

In one embodiment, the subfolder index values 550 may be universal, or global in nature. Accordingly, an association list 539 may point to a specific index number 545a or other identifier. For example, the use of distinguished names 124 in directory services objects 92 may provide for an index 545a that includes sufficient context 148 (see FIGS. 5–6) to uniquely identify a specific folder name 545b in any consumer object 524.

More efficiently, link data 548 may simply be included in an association list 539 identifying the distinguished names 545a associated with consumer objects 524 linking to the resource object 522. Accordingly, once the foldering attributes 540 are reviewed, the folder identification 549b may then identify within the foldering attributes 540 the specific index number 545a of the proper entry 544 of the folder list 542.

Thus, although numerous architectural schemes may be provided, the resource object 522 may be architected effectively to point to consumer objects 524 by means of an association list 539. Unique subfolder index values 550, if global, point to a specific entry 544 in a specific folder list 542 in a specific consumer object 524. Alternatively, an association list 539 may contain link data 548 pointing to a consumer object 524 by means of a consumer distinguished name 545a or the like. Accordingly, a folder identifier 549b in a link data entry 548 in an association list 539 may identify a local index number 545a in a folder list 542, local to, and known only by, first identifying the consumer object 524 to which the folder list 542 pertains. In certain embodiments, both the subfolder index values 550 may be stored in a manner to imply their corresponding consumer objects 524. Otherwise, the values 550, bound as the link data 548 pointing to consumer objects 524 may be included.

The foldering API 554 may read 592 the association list 539 for each of the directory service resource objects 522 affected by the request 586. Reading 592 the association list 539 provides the link data 548 or folder index values 550, or both, as discussed above. The foldering API 554 may then link 594 the folder names 545b from the consumer object 524 with each of the resource objects 522.

The provide step 596 may also be performed by the foldering API 554 in writing, responding, or otherwise providing 596 the linked resource objects 522 and folder names 545b or index numbers 545a in hierarchy data 568.

The display step 598 may be executed by the display module 570. The display module 570 may draw on executables 574 to display 598 various icons 574 in accordance with a hierarchy 568 provided by foldering API 554.

In one embodiment, an apparatus and method in accordance with the invention provides true foldering and true subfoldering using attributes 110 in directory services objects 92, 100. All information required for linking consumer objects 524 to resource objects 522 in a hierarchy 568 of folders 545b may be contained within the directory services objects.

Although the hierarchy data 568 may be stored as attributes 110 in a directory services object 92 of either in consumer 524 or resource 522 type, the architecture of FIG. 10 has been shown to be quite efficient and effective. The resource object 522 carries the data 548, 550 unique to itself, while the consumer object 524 carries the attributes 536 having foldering attributes 540 unique to the consumer object 524.

The foldering API 554 (or its equivalent 554), may be written to be general, thus being applicable to any consumer object 524 and resource object 522. Likewise, the foldering API 554 illustrated need not be a burden on directory services objects 92 by being included in the methods 552 or methods 546, although it could be. Thus, the entire foldering system 520 may implemented without requiring any methods 546, 552 within the directory services objects 92, (e.g. objects 522, 524).

Meanwhile, the network administration module 528 (e.g. network administration module 220, see FIG. 8) may operate within the directory services system 80 (see FIG. 3) in order to manage the 584 or provide 584 the foldering attribute values 540, 550, 548, of the directory services resource objects 522 and consumer objects 524. This division of function or labor among the executables 554, 530 and the operational data 540, 548, 550 has been shown to be efficient, effective, and robust.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for managing a foldering hierarchy for data structures using a directory service system, the apparatus comprising:

a computer system containing a processor, operably connected to a memory device storing executable and operational data structures comprising:

a directory services system for storing at least one resource object corresponding to a resource, and consumer objects corresponding to entities for consuming the resource;

a resource object selected from the at least one resource object and comprising a foldering attribute for selectively binding the consumer objects to the resource object in an arbitrary foldering hierarchy selected by a consumer;

a foldering utility, executable to manage the value of the foldering attribute; and a consuming executable programmed for binding the consumer objects to the resource object in an organized arrangement.

2. The apparatus of claim 1, wherein the foldering attribute is an index corresponding a selected consumer object of the consumer objects to a folder representing a relationship in the organized arrangement.

3. The apparatus of claim 1, wherein the consuming executable is effective to create a folder hierarchy.

4. The apparatus of claim 1, wherein a consumer object contains a foldering attribute effective to store an organizational relationship for displaying an image corresponding to the resource object.

5. The apparatus of claim 1, wherein the resource object further comprises an association list storing identifiers corresponding to folders and subfolders.

6. The apparatus of claim 1, wherein the resource object corresponds to a physical entity and the foldering attribute is effective for organizing the plurality of the resources unique for each node of nodes networked together in the computer system.

7. The apparatus of claim 6, wherein the plurality of nodes is configured to provide a directory services server effective to store and manage the resource objects, a client node for accessing the resource objects provided by the directory services server, and programmed to create a foldering organization for linking the resource object by comparing a proximity attribute of the resource object to a location of the client node.

8. The apparatus of claim 7, wherein the foldering attributes reflect a hierarchy relating a plurality of folders to one another.

9. The apparatus of claim 1 wherein the resource object contains a binding attribute effective to bind the resource object, with respect to a consumer object, and wherein the consuming executable is effective to operate based on the value at the binding attribute.

10. The apparatus of claim 9, further comprising a display connected to the processor, and wherein the foldering attribute is provided to control the display of images reflecting an organization of resources in folders and subfolders.

* * * * *